United States Patent [19]

Iino

[11] Patent Number: 5,937,717

[45] Date of Patent: *Aug. 17, 1999

[54] DEVICE FOR FEEDING AND DISCHARGING A WORK IN AN AUTOMATIC HOLLOW-PIPE CUTTING APPARATUS

[76] Inventor: Mitsunobu Iino, 1-380, Takahana-cho, Ohmiya-shi, Saitama-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/681,841

[22] Filed: Jul. 29, 1996

[30] Foreign Application Priority Data

Aug. 18, 1995 [JP] Japan ................................. 7-210770

[51] Int. Cl.⁶ ............................. B23D 21/00; B26D 5/42; B26D 7/06
[52] U.S. Cl. .............................. 83/277; 83/130; 83/163; 83/206; 83/227; 83/268; 83/437.6
[58] Field of Search ............................. 83/153, 112, 130, 83/135, 136, 206, 268, 277, 282, 227, 196, 198, 160, 437.6

[56] References Cited

U.S. PATENT DOCUMENTS

| | | | |
|---|---|---|---|
| 771,752 | 10/1904 | Stafford | 83/198 X |
| 845,331 | 2/1907 | Briede | 83/277 |
| 1,859,962 | 5/1932 | Ferenci | 83/268 |
| 2,196,209 | 4/1940 | Glunz | 83/136 X |
| 3,064,607 | 11/1962 | Gothe et al. | 83/277 X |
| 3,072,002 | 1/1963 | Kuba | 83/277 X |
| 3,701,301 | 10/1972 | Gudmestad | 83/277 X |
| 4,003,278 | 1/1977 | Shields | 83/277 X |
| 4,082,022 | 4/1978 | Horn et al. | 83/198 X |
| 4,205,569 | 6/1980 | Horn et al. | 83/198 X |
| 4,321,848 | 3/1982 | Millar et al. | 83/277 X |
| 4,342,240 | 8/1982 | Gaiser et al. | 83/153 X |
| 4,470,330 | 9/1984 | Lindell | 83/198 X |
| 4,524,656 | 6/1985 | Del Fabro et al. | 83/277 X |
| 4,596,174 | 6/1986 | LaFleur | 83/277 X |
| 4,732,066 | 3/1988 | Del Fabro et al. | 83/277 |
| 4,781,092 | 11/1988 | Gaiser | 83/277 X |
| 4,942,796 | 7/1990 | Dom et al. | 83/282 X |
| 5,156,073 | 10/1992 | Zanzerl et al. | 83/268 X |

FOREIGN PATENT DOCUMENTS

| | | |
|---|---|---|
| 0 418 192 A2 | 3/1991 | European Pat. Off. . |
| 2 457 145 | 12/1980 | France . |
| 24 30 608 | 1/1975 | Germany . |
| 645 703 | 10/1984 | Switzerland . |
| 450716 | 1/1976 | U.S.S.R. ................................. 83/277 |
| 721255 | 3/1980 | U.S.S.R. ................................. 83/198 |
| 1178525 | 9/1985 | U.S.S.R. ................................. 83/277 |
| 1214290 | 2/1986 | U.S.S.R. ................................. 83/277 |

*Primary Examiner*—Rinaldi I. Rada
*Assistant Examiner*—Charles Goodman
*Attorney, Agent, or Firm*—Kane,Dalsimer,Sullivan,Kurucz,Levy,Eisele and Richard, LLP

[57] ABSTRACT

A device for feeding and discharging a work in an automatic hollow-pipe cutting apparatus comprises: a cutter device for cutting a hollow pipe; a cam lever driving mechanism for sending the hollow pipe to the cutter device; a fixed chuck device disposed near the cutter device; a movable chuck device disposed away from the cutter device; a movable die core disposed inside the cutter device and inside the hollow pipe; another cam lever driving mechanism for moving the movable chuck device; a stopper and ejector fitted to the fixed die core; whereby when the hollow pipe is fed to the cutter device, the fixed chuck device grasps and release the hollow pipe and the movable chuck device also grasps and release the hollow pipe but at timing different from grasping and releasing by the fixed chuck means and the feeding of the hollow pipe into the cutter device is performed by movement of the movable chuck device by means of the other cam lever driving mechanism, and after the hollow pipe is cut, during lowering of a slider which accommodate the stopper and ejector and a movable shearing cutter of the cutter device, the stopper and ejector is sent back by means of a cam in the direction reverse to the feeding direction of the hollow pipe into the cutter device so that a cut piece is discharged.

2 Claims, 4 Drawing Sheets

DEVICE FOR FEEDING AND DISCHARGING A WORK IN AN AUTOMATIC HOLLOW-PIPE CUTTING APPARATUS

BACKGROUND OF THE INVENTION

1. Field of the Invention

The present invention relates to a device for feeding and discharging a work in an automatic hollow pipe cutting apparatus.

2. Description of the Prior Art

JP-A-3-19719 discloses a pipe shearing device. This known shearing device is provided with a fixed die core and a movable die core, these die cores being inserted into a pipe to be sheared. The movable die core is however loosely fitted in the pipe, and, therefore, the pipe is not clamped by the movable die core in the inside of the pipe and by the fixed die core in the outside of the pipe. Accordingly, the pipe is sheared in movable state and cannot be sheared precisely.

JP-A-2-190211 discloses shearing blade mount for cut-off die set. This known shearing blade mount relates to a shearing blade assembly for use in a double cut die set of the type used to cut tubing continuously emanating from a pipe mill. This shearing blade assembly used in conjunction with the notching blade of the cut-off die set. This device includes a mounting block fixed to the upper platen of a die set, and a shearing blade mounted to a shearing blade carriage. The shearing blade cartridge is then inserted into the mounting block and is retained in a position by a am lock assembly. The cam lock assembly and carriage system allows the shearing blade to be quickly and effectively removed and replaced as needed. However, this shearing blade assembly does cut the pipe which is clamped in the outside of the pipe by two opposite jaws, but the pipe is not clamped in the inside of the pipe by a movable die core, therefore the pipe can not be cut undeformedly and precisely.

SUMMARY OF THE INVENTION

It is therefore an object of the present invention to eliminate such defects in the prior art.

In order to attain the above object, according to an aspect of the present invention, a device for feeding and discharging a work in an automatic hollow-pipe cutting apparatus comprises: a cutter device for cutting a hollow pipe; a cam lever driving mechanism for sending the hollow pipe to the cutter device; a fixed chuck device disposed near the cutter device; a movable chuck device disposed away from the cutter device; a movable die core disposed inside the cutter device and inside the hollow pipe; another cam lever driving mechanism for moving the movable chuck device; a stopper and ejector fitted to the fixed die core; whereby when the hollow pipe is fed to the cutter device, the fixed chuck device grasps and release the hollow pipe and the movable chuck device also grasps and release the hollow pipe but at timing different from grasping and releasing by the fixed chuck means and the feeding of the hollow pipe into the cutter device is performed by movement of the movable chuck device by means of the other cam lever driving mechanism, and after the hollow pipe is cut, during lowering of a slider which accommodate the stopper and ejector and a movable shearing cutter of the cutter device, the stopper and ejector is sent back by means of a cam in the direction reverse to the feeding direction of the hollow pipe into the cutter device so that a cut piece is discharged.

DESCRIPTION OF THE PREFERRED EMBODIMENT

A device for feeding and discharging a work in an automatic hollow pipe cutting apparatus according to the present invention will be described below on the basis of an embodiment illustrated in the accompanying drawings.

Figure 1:
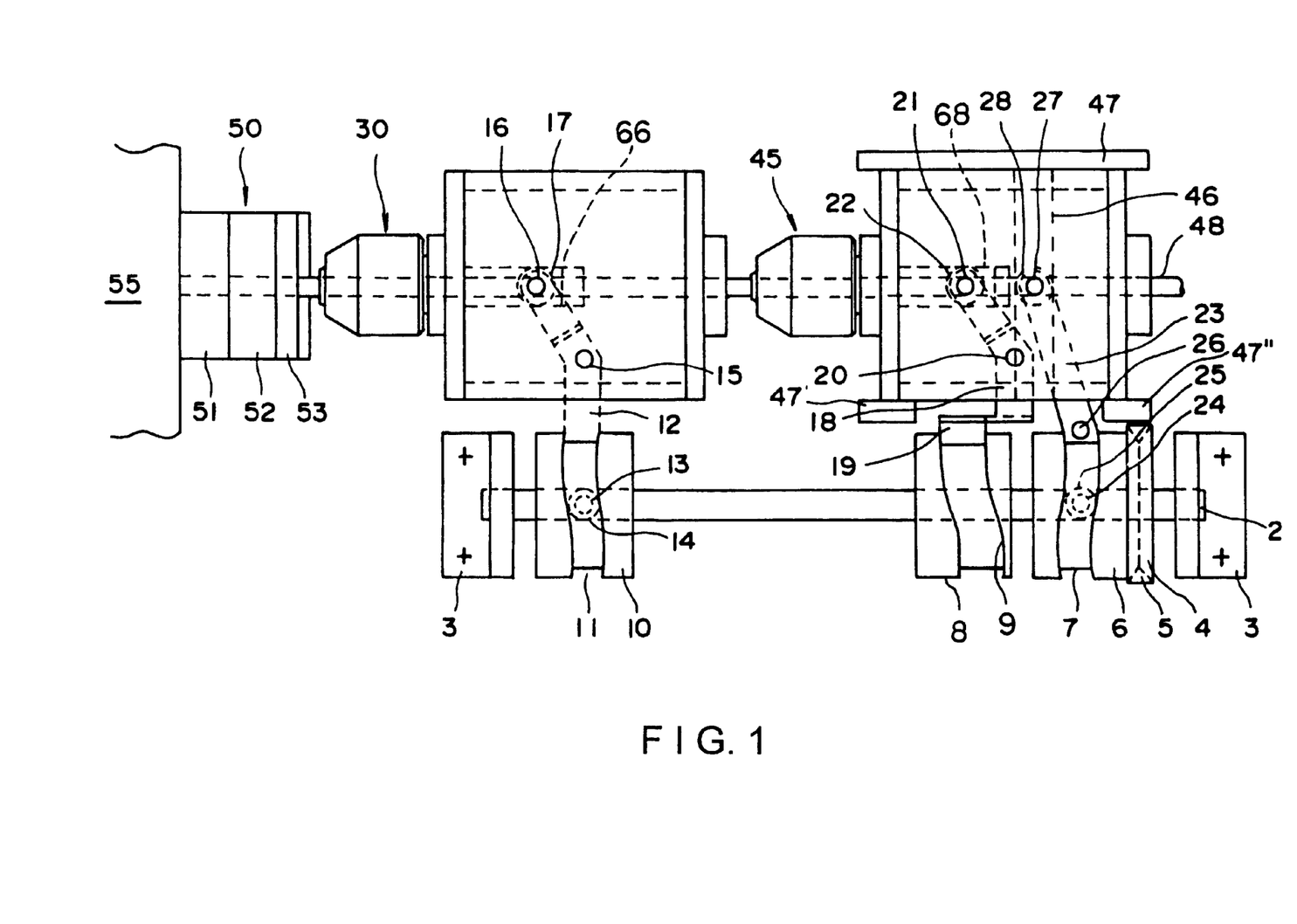
FIG. 1 is a plan view of a device for feeding and discharging a work in an automatic hollow pipe cutting apparatus as an embodiment according to the present invention.
Figure 2:
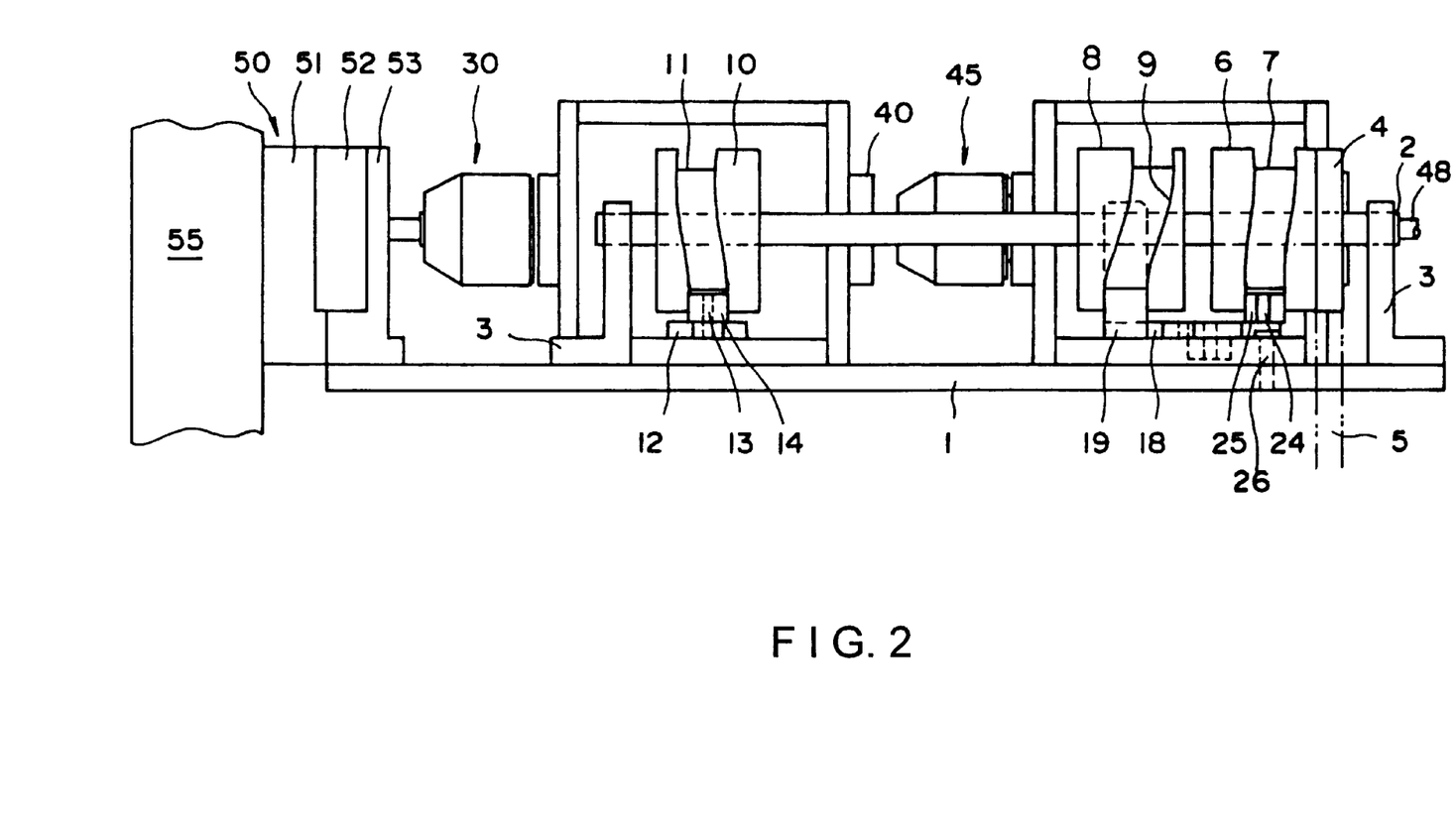
FIG. 2 is a front view of the work feeding and discharging device in the automatic hollow pipe cutting apparatus according to the present invention.
Figure 3:
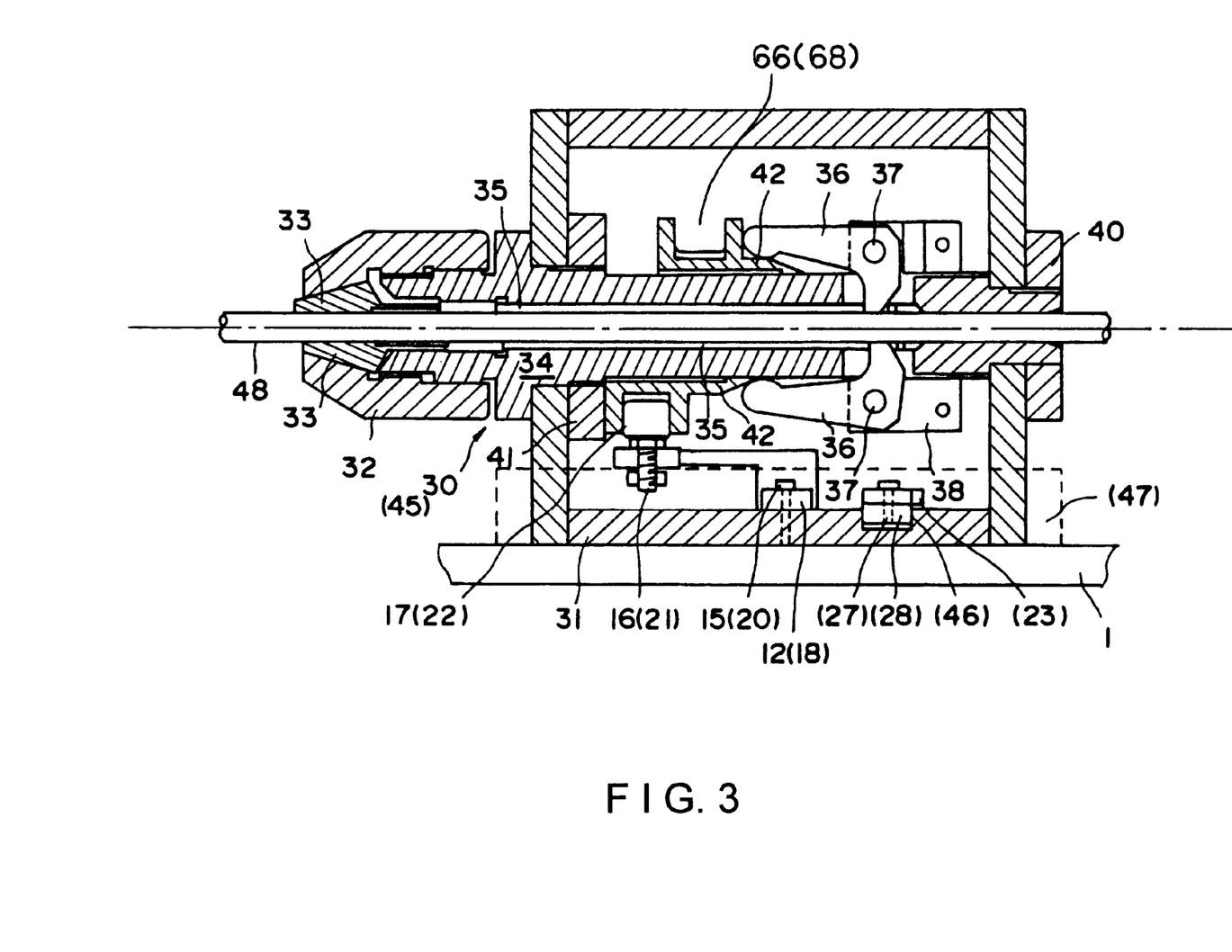
FIG. 3 is a center sectional view of a chuck device used in the work feeding and discharging device in the automatic hollow pipe cutting apparatus according to the present invention.

Referring to FIGS. 1 to 3, a device for feeding and discharging a work in an automatic hollow pipe cutting apparatus according to the present invention is mounted on a base plate 1 of a not-shown machine carriage. A cam shaft 2 is rotatably supported by a pair of right and left brackets 3 in the drawing so that the cam shaft 2 is continuously rotated by the rotation force transmitted trough a timing pulley 4 and a timing belt 5 from a not-shown motor-driven main shaft. An elevation cam for driving the elevation of a slider 55 is supported by the cam shaft 2. The slider 55 accommodates a movable shearing cutter 51 of a cutter device 50 for cutting a hollow pipe. A cam 6 for moving a movable chuck device 45, a cam 8 for controlling a chuck opening/closing operation lever 18, and a cam 10 for controlling a chuck opening/closing operation lever 12 are fixedly mounted on the cam shaft 2 in this order from the right to the left in FIG. 1. The cam 6 has a cam groove 7 in its circumference, the cam 8 has a cam face 9 which is in contact with a cam contact portion 19 of the chuck opening/closing operation lever 18 at its one end, and the cam 10 has a cam groove 11. The chuck opening/closing operation lever 12 is provided with a roller 14 rotatably fixed by means of a roller pin 13 on one end of the chuck opening/closing operation lever 12 so that the roller 14 is in contact with a cam face of the cam groove 11. The chuck opening/closing operation lever 12 is pivotally supported, by means of a pivot 15, on a chuck housing 31 of a fixed chuck device 30. A roller 17 is rotatably supported, by means of a roller pin 16, on the other end of the chuck opening/closing operation lever 12 so that the roller 17 is engaged into an operating groove 66, as shown in FIG. 3, of a chuck opening/closing cam 42 of the fixed chuck device 30. The chuck opening/closing cam 42 is provided at its right end with a cam face like a truncated cone and is arranged so that the chuck opening/closing cam 42 per se moves, on a chuck device body 34, in the axial direction of a hollow pipe 48. Thus, when the chuck opening/closing operation lever 12 is turned by the chuck opening/closing operation lever controlling cam 10, the chuck opening/closing cam 42 moves, pawls 36 are pushed at their one ends so as to respectively turn around pins 37 fixed to the chuck device body 34, a sleeve 35 for chuck opening/closing operation is moved left in FIG. 3 by the other ends of the respective pawls 36, and an extension sleeve 33 of the fixed chuck device 30 is closed so that the hollow pipe 48 is immovably grasped in the vicinity of a movable die core 49.

Figure 4:
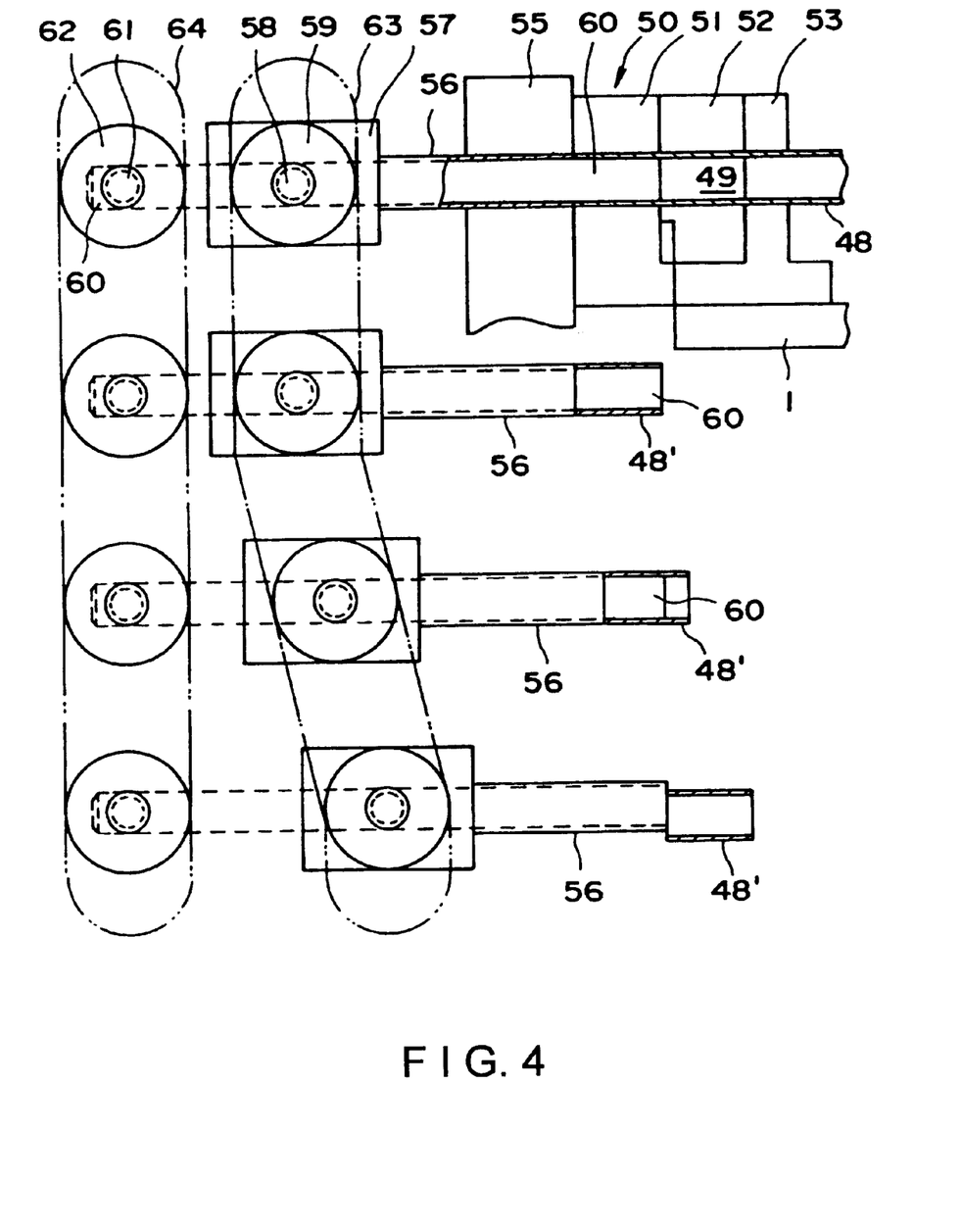
FIG. 4 is a front view of a work discharging mechanism of the work feeding and discharging device in the automatic hollow pipe cutting apparatus according to the present invention.

The chuck opening/closing operation lever 18 of the movable chuck device 45 is pivotally supported by a pivot 20 on a chuck housing 31 of the movable chuck device 45. A roller 22 is rotatably pivoted by a roller pin 21 at the other end of the chuck opening/closing operation lever 18. Also in the movable chuck device 45, similarly to the fixed chuck device 30, the roller 22 is engaged into an operating groove 68, as shown in FIG. 3 of a chuck opening/closing cam 42. Accordingly, the chuck opening/closing operation lever 18 is urged through its cam contact portion 19 to turn around the pivot 20 by means of the cam 8 for controlling the chuck opening/closing operation lever 18, so that a chuck opening/closing cam 42 is thereby moved in the axial direction of the hollow pipe 48 (shown in the upper half of FIG. 3), pawls 36 are turned around respective pins 37 by means of the chuck opening/closing cam 42, a sleeve 35 for chuck opening/closing operation is moved left in FIG. 3 by the other ends of the respective pawls 36, and an extension sleeve 33 of the movable chuck device 45 is closed so that the hollow pipe 48 is grasped (shown in the upper half of FIG. 3). The grasping and release of the hollow pipe 48 by means of the extension sleeve 33 in the movable chuck device 45 are carried out in relation with but in timing different from the grasping and release of the hollow pipe 48 by means of the extension sleeve 33 in the fixed chuck device 30. That is, when the movable chuck device 45 has grasped the hollow pipe 48, the movable chuck device 45 moves toward the cutter device 50 while grasping the hollow pipe 48 and stops moving at a position where the left end of the hollow pipe 48 comes into contact with the right end of a stopper and ejector 56 as shown in FIG. 4. At that time, also the fixed chuck device 30 grasps the hollow pipe 48 and automatic cutting of the hollow pipe 48 is carried out by means of the cutter device 50. After automatic cutting of the hollow pipe 48, the fixed chuck device 30 releases the hollow pipe 48, and also the movable chuck device 45 releases the hollow pipe 48 and retreats from the cutter device 50 in the direction opposite to the feeding direction of the hollow pipe 48 (rightward in FIG. 2). The movable chuck device 45 grasps the hollow pipe 48 again in the retreated position, and the next work feeding cycle is started.

A roller 25 pivoted, by a roller pin 24, on one end of an operation lever 23 for moving the movable chuck device 45 is engaged into the cam groove 7 of the cam 6 for moving the movable chuck device 45. The operation lever 23 for moving the movable chuck device 45 is pivotally supported, by means of a pivot 26, on the base plate 1. A roller 28 is rotatably supported, by means of a roller pin 27, on the other end of the operation lever 23 for moving the movable chuck device 45 so that the roller 28 is engaged into an operation groove 46 formed in the housing 31 of the movable chuck device 45. Thus, the operation lever 23 is turned by the rotation of the cam 6 so that the movable chuck device 45 is made to perform reciprocating movement in the axial direction of the hollow pipe 48. When the movable chuck device 45 moves forward and moves backward, the cam contact portion 19 of the chuck opening/closing operation lever 18 slides on the cam face 9 of the cam 8 for controlling the chuck opening/closing operation lever 18 while contacting with the cam face 9. In this case, since the cam face 9 is formed so that it has the same contour in any position in the axial direction of the cam shaft 2, the turning operation of the chuck opening/closing operation lever 18 is not influenced by the movement of the movable chuck device 45 but it is controlled only by the cam diagram of the cam face 9 of the cam 8 for controlling the chuck opening/closing operation lever 18, regardless of the state of the movable chuck device 45 as to whether the movable chuck device 45 is moving or not.

When the hollow pipe 48 is being cut, the forward end of the hollow pipe 48 is pressed against the end surface of the stopper and ejector 56, and, in the inside of the hollow pipe 48, the end of a fixed die core 60 which is fitted into the hollow pipe 48 by a predetermined size is in contact with the forward end of a movable die core 49 which is fitted into the hollow pipe 48 by a predetermined size so that the position of the hollow pipe 48 is immovably grasped during the cutting operation. Accordingly, accurate cutting of the hollow pipe 48 is ensured in the axial direction as well as in the radial direction and the length, the external form and the inside diameter of a cut piece is ensured with predetermined accuracy.

After the hollow pipe 48 is cut, during lowering of the slider 55 which accommodate the movable shearing cutter 51 of the cutter device 50 and the stopper and ejector 56 fitted to fixed die core 60, a cut piece 48' is discharged from the fixed die core 60 by the stopper and ejector 56 by the mutual movement between a grooved cam 63 for the stopper and ejector 56 and a grooved cam 64 for the fixed die core 60.

Further, the reference numeral 32 designates an adjusting ring which is fixed to the extension sleeve 33. The adjusting ring 32 cooperates with the extension sleeve 33 so as to clamp the pipe 48 to be cut. The reference numeral 38 designates a bracket provided with the pins 37 which bear the pawls swingably. The reference numerals 40 and 41 designate nuts which are used to secure the bracket 38 to the chuck device housing 31 and to secure the body 34 to the chuck device, respectively.

The reference numerals 47, 47', and 47" designate guides for movable chuck device 45, the guides being arranged on the base plate 1 so as to guide the movable chuck device 45 in the longitudinal direction.

The reference numeral 52 designates a fixed shearing cutter fixed to a support 53 for supporting the fixed shearing cutter 52. The fixed shearing cutter 52 cooperates with the movable shearing cutter 51 to cut the pipe 48 under application of shearing force between the cutters 51 and 52.

The reference numeral 57 designates a bracket to which the stopper and ejector 56 is fixed. The stopper and ejector 56 is used to stop the feeding of the pipe 48 in the longitudinal direction and is used to eject the cut piece 48' outside the cutting apparatus after cutting operation.

The reference numeral 59 designates a roller rotatably supported on a roller pin 58 which is secured to the bracket 57. The roller 59 is engaged with the groove of the grooved cam 63 for the stopper and ejector 56. The reference numeral 62 designates a roller rotatably supported on a roller pin 61 which is secured to the fixed die core 60 across its longitudinal axis. The roller 62 is engaged with the groove of the grooved cam 64 for the fixed die core 60.

According to the present invention, the work feeding/discharging can be carried out rapidly and accurately. The work can be worked with predetermined preciseness in its length, and inner and outer diameters. Further, no burr or no injury is produced in the work and therefore no additional working step to eliminate such defects.

What is claimed is:

1. A device for feeding and discharging a work in an automatic hollow-pipe cutting apparatus, said device comprising:

a cutter device for cutting a hollow pipe, said cutter device including a movable shearing cutter;

a cam lever driving mechanism for sending said hollow pipe to said cutter device;

a fixed chuck device disposed near said cutter device for grasping and releasing said hollow pipe when said hollow pipe is fed into said cutter device;

a movable chuck device disposed away from said cutter device for grasping and releasing said hollow pipe when said hollow pipe is fed into said cutter device at a timing different from grasping and releasing by said fixed chuck device;

a movable die core disposed inside said cutter device and inside said hollow pipe;

another cam lever driving mechanism for moving said movable chuck device, the feeding of said hollow pipe into said cutter device being performed by movement of said movable chuck device by said another cam lever driving mechanism; and a stopper and ejector fitted to a fixed die core, said stopper and ejector and said shearing cutter being accommodated in a slider, said movable die core being held immovable relative said fixed die core, when said hollow pipe is being cut, by the grasping of said hollow pipe by said fixed chuck device;

wherein after said hollow pipe is cut to obtain a cut piece, during lowering of said slider which accommodate said stopper and ejector and said movable shearing cutter of said cutter device, said stopper and ejector is sent back by a cam in a direction reverse to a feeding direction of said hollow pipe into said cutter device so that said cut piece is discharged.

2. The work feeding/discharging device according to claim 1, wherein said fixed die core is held immovable by another cam in the direction reverse to the feeding direction of said hollow pipe into said cutter device during the lowering of said slider.

* * * * *

UNITED STATES PATENT AND TRADEMARK OFFICE
CERTIFICATE OF CORRECTION

PATENT NO. : 5,937,717
DATED : August 17, 1999
INVENTOR(S) : Mitsunobu Iino

Page 1 of 3

It is certified that error appears in the above-identified patent and that said Letters Patent is hereby corrected as shown below:

In the Drawings:

Delete drawing sheets 1-2, and substitute therefor the drawing sheets consisting of Figs. 1-2, as shown on the attached pages.

Signed and Sealed this

Sixth Day of June, 2000

Attest:

Q. TODD DICKINSON

Attesting Officer

Director of Patents and Trademarks

FIG. 2

FIG. 1